April 16, 1957     A. F. HAYEK     2,788,677

THREE DIMENSIONAL CAM FOLLOWER

Filed Jan. 31, 1956

INVENTOR.
ARTHUR F. HAYEK
BY
ATTORNEY.

United States Patent Office 2,788,677
Patented Apr. 16, 1957

2,788,677

THREE DIMENSIONAL CAM FOLLOWER

Arthur F. Hayek, Pleasantville, N. Y., assignor to General Precision Laboratory Incorporated, a corporation of New York Application January 31, 1956, Serial No. 562,492

4 Claims. (Cl. 74—569)

The present invention relates to a cam follower and particularly to one having a rolling point contact surface that can rotate in any azimuthal plane to accommodate its operation over a three-dimensional cam.

In the case of two-dimensional cams the followers operate in a single plane and the problem of providing antifriction bearing surfaces between the cam and its follower is limited to one azimuthal plane of operation. In such instances antifriction rolling bearing surfaces revolving about a fixed axis presents no particular problem. However, in three-dimensional cams, in order to provide the necessary accuracy it is necessary to provide antifriction rolling bearing surfaces in all azimuthal planes without any sliding friction surfaces opposing any relative movement between the cam and the cam follower.

Heretofore, ball point cam followers have been used, but in these prior devices no provision has been made for mounting the ball so that the direct thrust is taken by rolling surfaces only, regardless of the azimuthal plane of operation, to thereby substantially eliminate sliding friction. In the present invention only the extremely small lateral guiding forces on the ball are applied through sliding friction surfaces. These latter sliding surfaces do not appreciably affect the accuracy or sensitivity of the cam follower. On the other hand, the static friction between sliding surfaces which take the operating thrust forces between the cam and its follower cause a so-called "hysteresis" error when the cam follower reverses the direction of its movement.

The primary object of the present invention is to provide a cam follower that will follow a three-dimensional cam with a minimum of friction regardless of the direction of relative movement between the cam and the follower.

Another object is to provide a cam follower having a rolling surface that can rotate in any azimuthal plane and in which the thrust along the intersection of the azimuthal planes is supported only by rolling surfaces.

Figure 1:
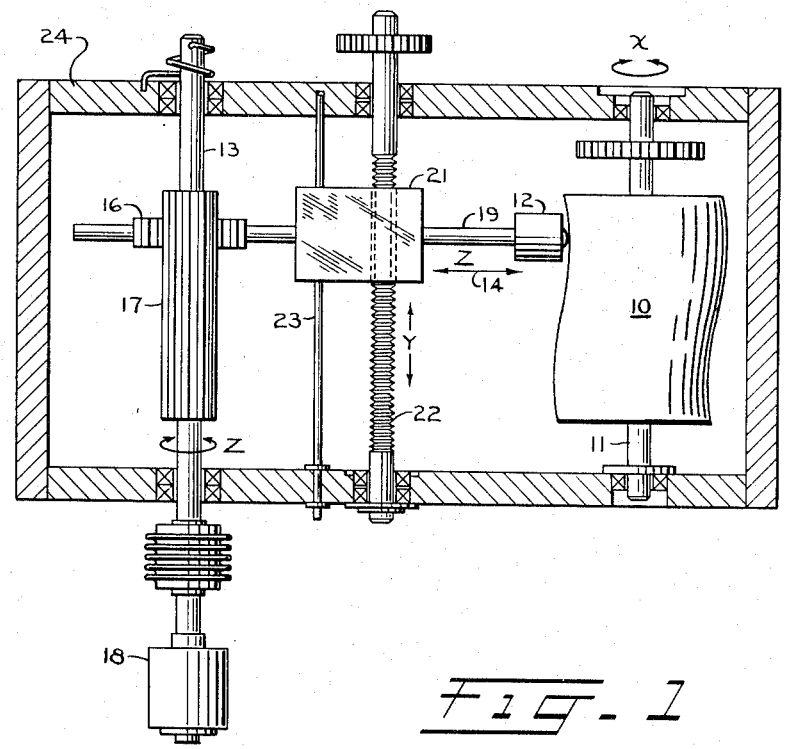
Figure 2:
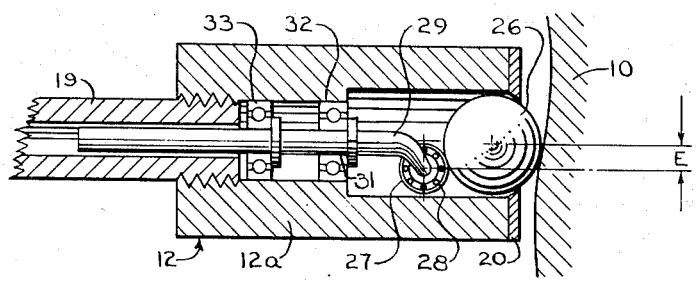

Other and further objects will become readily apparent from the following description when considered in connection with the accompanying drawing in which:

Figure 1 is a plan view of a cam follower assembly in which the present invention is embodied; and Figure 2 is an enlarged sectional detail of the cam follower in accordance with the present invention.

Basically, the cam follower of the present invention comprises a ball, such as a ball bearing, mounted adjacent the open end of an encompassing housing member, the sides of the housing engaging the sides of the ball to guide it in the horizontal or ground plane and with an antifriction caster resting on the ball, the caster being dirigibly mounted in antifriction bearings on a vertical axis to take the operating thrust.

Referring to Fig. 1 for environmental background, a three-dimensional cam 10, having a relief surface of revolution is secured to a drive shaft 11. The angular displacement of the cam 10 constitutes one dimension of the cam surface in the horizontal or X—Y ground plane, such as the X-abscissa, while the relative movement of the cam follower 12 in directions parallel to the shaft 11 constitutes the second dimension, or Y-ordinate, in the ground plane. The third dimension along the Z-axis is represented by the peripheral profile of the cam 10 which causes movement of the cam follower 12 in the directions of the double pointed arrow 14 at right angles to the shaft 11. The rectilinear movement of the cam follower 12 may be converted, by means of a suitable rack and pinion mechanism 16, 17, into rotational displacement in accordance with the combined inputs X and Y, of a utilization device, such as a position synchro 18, coupled to the shaft 13.

To this end, the cam follower 12 is mounted on a rod 19 slidably supported on a carriage 21 guided for reciprocating movement in the direction of the arrows 14. Through means of a threaded shaft 22 and a smooth rod 23 the carriage 21 is supported by a frame 24 in which the shafts 11 and 13 are journalled. The shaft 22 threadedly engages the carriage 21 so that rotation of the shaft 22 in accordance with the desired Y-ordinate input will cause the carriage 21 to move along shaft 22, with the direction depending upon the direction of rotation, by an amount representing the Y-ordinate. Means for rotating the shaft 22 is not shown but any conventional means may be used.

The cam follower 12 comprises a cylindrical housing 12a (Fig. 2) which has an open end that encompasses and approximately fits the outside of a hardened polished steel ball 26. An annular disc 20 secured to the outer end of the casing 12a has an internal annular lip which is smaller in diameter than the diameter of the steel ball 26 to retain the latter within the open end of the casing 12a. The only sliding friction is between the sides of the ball and the walls of the recess in the housing 12a. Since the lateral forces between the sides of the ball and the casing are only those which are necessary to guide the ball over the cam 11 the sliding friction is very small. To prevent the ball 26 from moving inward in the recess of the casing 12a and to take the thrust on the ball 26, a castor wheel 27 is journalled through antifriction bearings 28 in the arms of a dirigible fork 29. The castor wheel 27 is journalled on an axis which is displaced from the center of the ball 18 by an amount represented by the distance E. For minimum lateral thrust of the ball against the side of the retainer housing, the distance E should be kept small. The fork 29 is provided with a shank 31 dirigibly mounted for pivotable movement in combination thrust and radial ball bearings 32 and 33 fitted in a recess in the housing 12a.

It will be noted from the drawing that the vertical thrust applied to the ball 26 is along an axis parallel to the vertical axis of the ball 26 and through the axis of the dirigible mounting of the castor wheel 27. Accordingly, relative movement between the housing 12a and the surface of the cam 10 will cause the ball 26 to rotate about a horizontal axis which is transverse to the tangent to the path of contact of the ball 26 with the surface of cam 10. Accordingly, the path of the rolling contact between the ball 26 and the cam surface determines the azimuthal plane of rotation of the ball 26. Since the point of contact between the ball 26 and the castor wheel 27 is displaced laterally with respect to the vertical axis through the ball 26 the castor wheel 27 will immediately take up a position in the azimuthal plane of rotation of the ball 26. Since the shank 31 of the fork 29 is mounted in antifriction bearings and since the castor wheel 27 is journalled on friction bearings the rotation of the ball 26 is opposed only by rolling contact friction for any orientation of the azimuthal plane of rotation of the ball 26. The path of the contact between the ball 26 and the surface of cam 10 will be determined by the resultant of the two inputs in the X—Y ground plane, which as mentioned above, is represented, respectively, by the angular displacement of the cam 10 and the translational movement of the cam follower 12 in the direction parallel to the axis of rotation of the cam 10.

It will be seen from the above description that the three dimensional cam follower provided by this invention effectively provides a centerless wheel, that is, the ball 26, which is dirigible through 360° with all the output thrust along the Z-axis being taken by rolling friction as opposed to sliding friction. The only sliding friction is that slight amount due to the lateral thrust component resulting from the slight offset of the castor wheel 27 which is necessary to make the castor wheel orient itself with the plane of azimuthal rotation of the ball 26. It will be clear from the drawings that the plane of rotation of the castor wheel 27 automatically follows the orientation of the plane of rotation of the ball 26.

What is claimed is:

1. In a cam follower assembly, a movable member adapted to be moved in accordance with the surface of a cam, said member having a longitudinal recess, a ball rotatably fitted within said recess with a portion of said ball projecting beyond the open end of said recess and adapted to engage and roll in point contact with a two dimensional cam surface, means for transmitting thrust on said ball to said movable member comprising, a castor wheel engaging said ball and dirigibly journalled on a transverse axis spaced from the longitudinal axis of said recess, said castor being dirigibly connected to said movable member whereby rotation of said ball will cause said dirigibly mounted castor wheel to align its plane of rotation with that of the plane of rotation of said ball and to support all the cam thrust acting on said ball parallel to the axis of said recess.

2. In a cam follower assembly, a movable member adapted to be moved in accordance with the surface of a cam, said member having a longitudinal recess, a ball rotatably fitted within said recess with a portion of said ball projecting beyond the open end of said recess and adapted to engage and roll in point contact with a two dimensional cam surface, means for transmitting thrust on said ball to said movable member comprising, a castor wheel engaging said ball and journalled on a dirigible transverse axis spaced from the longitudinal axis of said recess, said castor wheel being dirigibly connected to said movable member and responsive to rotation of said ball for orienting itself for supporting the forces on said ball normal to the cam surface by free rolling friction unopposed by any sliding friction regardless of the direction of relative movement of the ball and movable member relative to said cam surface.

3. In a cam follower assembly, a movable member adapted to be moved in accordance with the surface of a cam, said member having a longitudinal recess, a ball rotatably fitted wtihin said recess with a portion of said ball projecting beyond the open end of said recess and adapted to engage and roll in point contact with a two-dimensional cam surface, means for transmitting thrust on said ball to said movable member along the longitudinal axis thereof comprising, a castor wheel engaging said ball and journalled on a dirigible transverse axis spaced from the longitudinal axis of said recess, said castor wheel being dirigibly mounted in antifriction bearings centered on the longitudinal axis of the recess in said movable member so that in response to rotation of said ball said castor wheel will automatically assume a position so that its axis of rotation will be parallel to the axis of rotation of said ball.

4. In a cam follower assembly, a movable member adapted to be moved in accordance with the surface of a cam, said member having a longitudinal recess, a ball rotatably fitted within said recess with a portion of said ball projecting beyond the open end of said recess and adapted to engage and roll in point contact with a two-dimensional cam surface, means for transmitting thrust on said ball to said movable member along the longitudinal axis thereof comprising, a castor wheel engaging said ball and journalled on a dirigible transverse axis spaced from the longitudinal axis of said recess, said castor wheel being dirigibly connected to said movable member by means of a castor fork having a shank and arms extending laterally of said shank, and on which said castor wheel is journalled, said shank being pivotally journalled about the longitudinal axis of said recess in said movable member, so that in response to rotation of said ball said castor wheel will automatically assume a position so that its axis of rotation will be parallel to the axis of rotation of said ball.

References Cited in the file of this patent
UNITED STATES PATENTS 2,151,832     Bugatti _____ Mar. 28, 1939